United States Patent [19]

Yamaguchi

[11] Patent Number: 4,718,525
[45] Date of Patent: Jan. 12, 1988

[54] SYSTEM FOR CONTROLLING START CLUTCH OF AUTOMATIC TRANSMISSION

[75] Inventor: Hiroshi Yamaguchi, Yokohama, Japan

[73] Assignee: Nissan Motor Co., Ltd., Yokohama, Japan

[21] Appl. No.: 848,481

[22] Filed: Apr. 7, 1986

[30] Foreign Application Priority Data

| Apr. 6, 1985 | [JP] | Japan | 60-73207 |
| Apr. 11, 1985 | [JP] | Japan | 60-77118 |
| Apr. 30, 1985 | [JP] | Japan | 60-92432 |

[51] Int. Cl.$^4$ ............................. B60K 41/28; F16D 43/28
[52] U.S. Cl. .............................. 192/0.052; 192/0.076; 192/109 F
[58] Field of Search ............ 192/0.052, 0.075, 0.076, 192/0.092, 103 F, 109 F; 74/866, 867, 877, 733

[56] References Cited

U.S. PATENT DOCUMENTS

| 3,722,646 | 3/1973 | Oguma | 192/109 F |
| 3,809,201 | 5/1974 | Miyanishi et al. | 192/109 F |
| 3,991,865 | 11/1976 | Komatsu | 192/109 F |
| 4,086,994 | 5/1978 | Hirosawa et al. | 192/109 F |
| 4,476,745 | 10/1984 | Moan | 74/866 |
| 4,487,303 | 12/1984 | Boneri et al. | 192/0.052 |
| 4,513,638 | 4/1985 | Nishikawa et al. | 74/866 |
| 4,603,604 | 8/1986 | Nishikawa et al. | 192/0.076 X |

FOREIGN PATENT DOCUMENTS 59-13156  1/1984  Japan .

Primary Examiner—Rodney H. Bonck
Assistant Examiner—Richard M. Lorence
Attorney, Agent, or Firm—Schwartz, Jeffery, Schwaab, Mack, Blumenthal & Evans

[57] ABSTRACT

A control system for controlling a fluid pressure to engage a start clutch of a vehicular automatic transmission has an actuator such as a solenoid valve for varying the fluid pressure supplied to the start clutch, a group of sensors for sensing one or more operating conditions of the vehicle and producing a start signal representing a start of the vehicle, and a controller such as a microcomputer for controlling the fluid pressure by sending a control signal to the actuator. In order to ensure a smooth start of the vehicle from a standing position in which the start clutch is disengaged, the controller varies the value of the control signal upon receipt of the start signal in such a manner that the control signal rises immediately, then falls rapidly to a low value, and finally increases gradually from the low value to an ultimate value.

16 Claims, 16 Drawing Figures

SYSTEM FOR CONTROLLING START CLUTCH OF AUTOMATIC TRANSMISSION

BACKGROUND OF THE INVENTION

The present invention relates to a control system for controlling an engagement pressure of a start clutch of an automatic transmission which is engaged in starting a vehicle, and more specifically to a control system for controlling a hydraulic pressure to engage the start clutch which is disengaged to prevent creep of the vehicle when the vehicle is in a standing position and engaged when the vehicle is started.

A vehicle equipped with an automatic transmission tends to creep because of a drag torque of a torque converter when the selector of the automatic transmission is held in a forward drive position (especially of a high gear ratio) while the vehicle is at rest.

A Japanese patent provisional publication No. 59-13156 discloses a conventional system for preventing a creep of a vehicle. In this system, an electromagnetic valve is disposed in a drain passage which branches off from a supply passage for supplying a fluid pressure to a start clutch or the like of an automatic transmission, and which leads to an oil tank. The electromagnetic valve closes the drain passage when it is deenergized, and opens the drain passage when it is energized. The control system of this conventional example is arranged to prevent shock due to engagement of the start clutch in starting a vehicle from a standing position, by chopping a circuit for energizing the electromagnetic valve a predetermined number of times.

However, in this system, an engagement of the start clutch is retarded by reason of a lag of the hydraulic system and the inertial mass of clutch plates of the start clutch, so that the engine races and the engine speed rises abnormally.

SUMMARY OF THE INVENTION

It is an object of the present invention to provide a control system for engaging a start clutch of an automatic transmission in starting a vehicle so as to prevent a shock due to engagement of the start clutch and simultaneously to prevent a delay of engagement of the start clutch.

According to the present invention, the control system for a vehicular automatic transmission having at least a start clutch which is engaged by supplying a fluid pressure, comprises actuator means, sensor means and controller means. The actuator means varies an engagement force of the start clutch by varying the fluid pressure supplied to the start clutch. The sensor means produces a start signal representing a start of the vehicle by sensing at least one parameter of the vehicle, such as a throttle position. The controller means is connected with the sensor means for controlling the fluid pressure supplied to the start clutch by sending a control signal to the actuator means. The controller means is arranged to increase the fluid pressure gradually upon receipt of the start signal. Furthermore, the controller means temporarily increases the fluid pressure immediately after the start signal is inputted to the controller means.

DETAILED DESCRIPTION OF THE INVENTION

Figure 1:
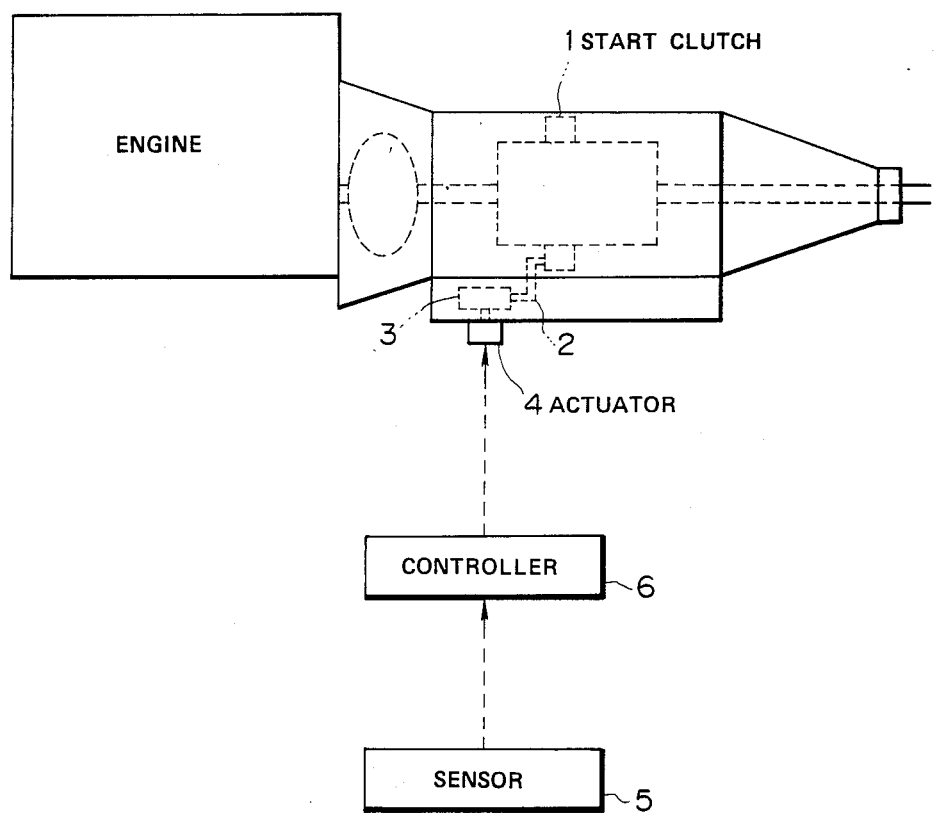
FIG. 1 is a schematic view illustrating roughly the present invention.

FIG. 1 shows, in a somewhat rough manner, a control system of the present invention for controlling a friction driving element such as a start clutch of an automatic transmission mounted on a vehicle together with an engine. The control system comprises an actuating device, a controller 6 and one or more sensors 5. The actuating device may comprise a fluid pressure control valve 3 disposed in a fluid passage 2 for supplying a fluid pressure to the start clutch 1, and a solenoid actuator 4 for controlling the control valve 3 in accordance with a control signal produced by the controller 6.

Figure 2:
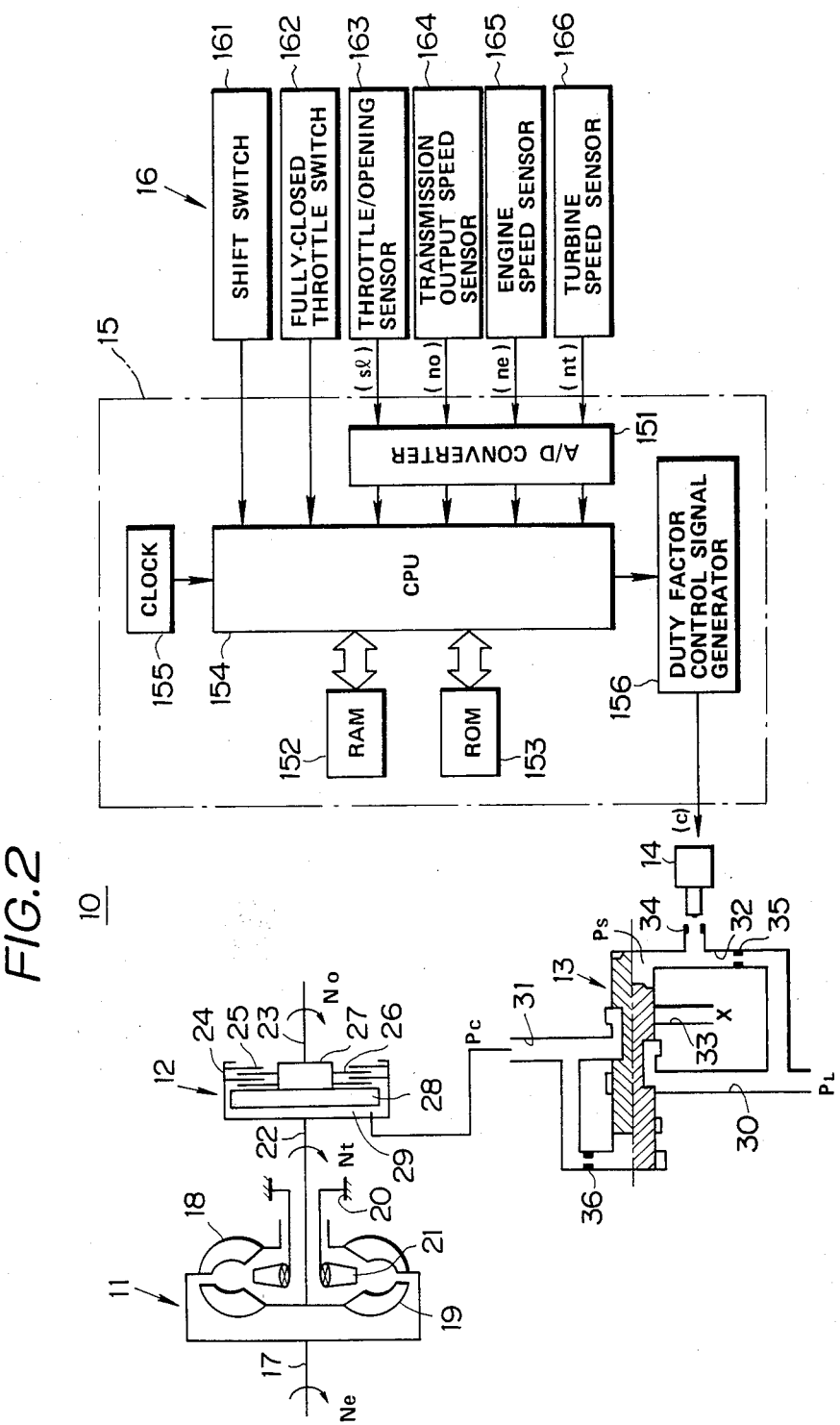
FIG. 2 is a schematic view of a control system of a first, second or third embodiment of the present invention.
Figure 3:
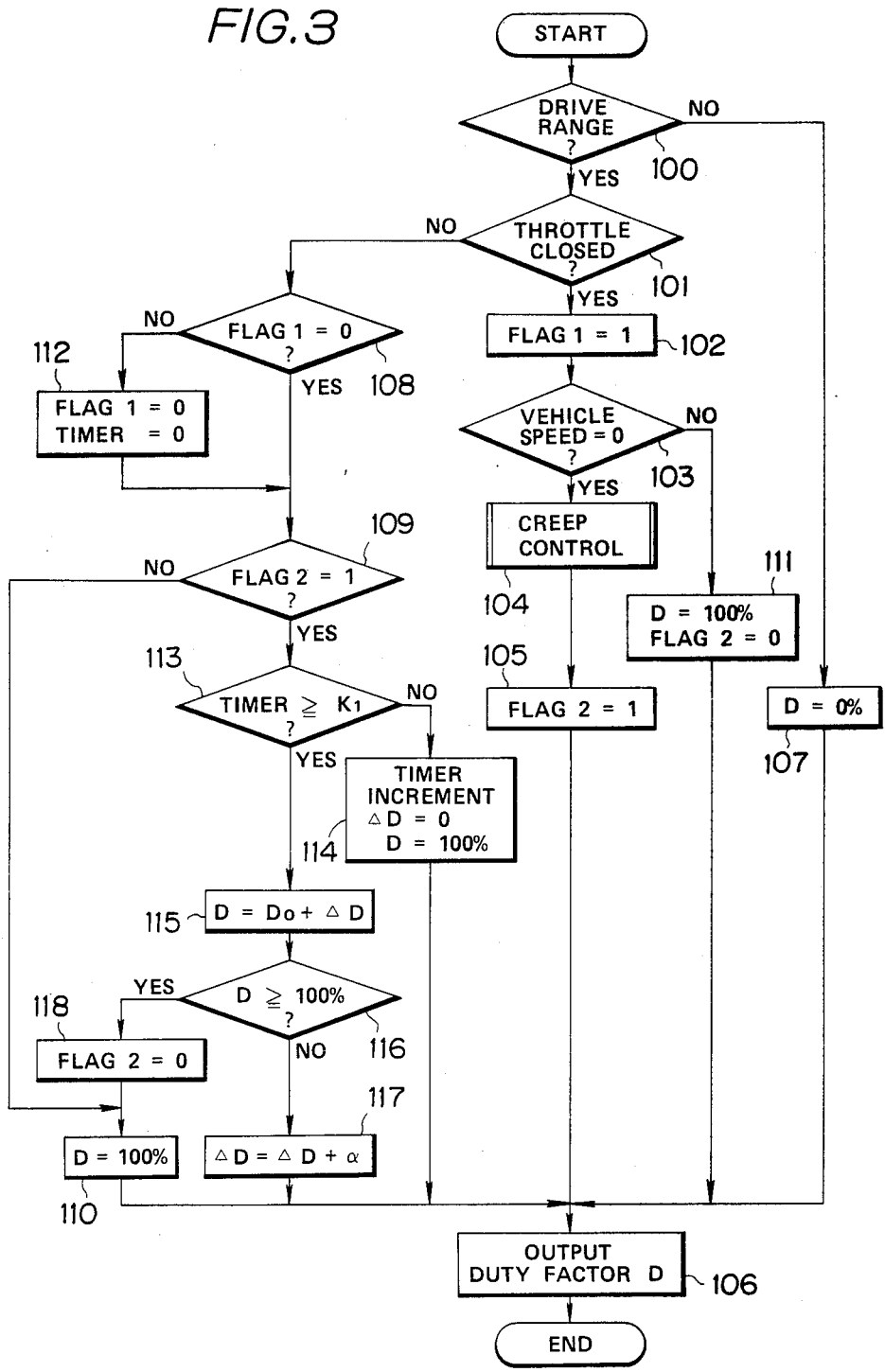
FIG. 3 is a flowchart of a program performed by a control unit of the first embodiment.

A first embodiment of the present invention is shown in FIGS. 2 and 3. A control system of the first embodiment is arranged to perform a creep control for preventing a creep of the vehicle, and a start control which is initiated when the creep control stops.

As shown in FIG. 2, the control system 10 for controlling a start clutch 12 of an automatic transmission having a torque converter 11, comprises a fluid pressure control valve 13, a solenoid valve 14, a control unit 15, and a group of sensors 16.

The torque converter 11 has a pump impeller 18 connected with an input shaft 17 which is driven by the engine, a turbine runner 19 driven by the pump impeller 18 through dynamic fluid action, and a stator or reactor 21 connected to a transmission case 20 through a oneway clutch. The turbine runner 19 is connected to a torque converter output shaft 22.

The start clutch 12 is engaged to connect gear members of an automatic transmission gear train such as a planetary gear system. The start clutch 12 is engaged to transmit power from the converter output shaft 22 to a transmission output shaft 23 in starting the vehicle from a standing position. The start clutch 12 has a clutch drum 24 connected with the converter output shaft 22, a clutch hub 27 connected with the transmission output shaft 23, an alternating series of first clutch plates 25 connected with the clutch drum 24 and second clutch plates 26 connected with the clutch hub 27, a clutch piston 28 provided on the clutch hub side, and a clutch pressure chamber 29 for actuating the clutch piston 28 by receiving a clutch control pressure $P_C$.

The fluid pressure control valve 13 is disposed in a line pressure passage 30 (within a control valve unit of the automatic transmission). The line pressure passage 30 is supplied with a line pressure $P_L$. A pressure regulator valve (not shown) produces the line pressure $P_L$ by regulating the fluid pressure discharged by an oil pump. The pressure chamber 29 of the start clutch 12 is connected with the fluid pressure control valve 13 by a control pressure passage 31. The control valve 13 is actuated by a valve actuating pressure $P_S$ which is controlled by the above-mentioned solenoid valve 14. The solenoid valve 14 is disposed in a branch passage 32 which branches off from the line pressure passage 30. When the solenoid valve 14 is in an off (deenergized) state, the actuating pressure $P_S$ is decreased, and accordingly, a spool of the pressure control valve 13 is moved rightwardly as viewed in FIG. 2. In this state of the valve 13, the line pressure $P_L$ supplied through the line pressure passage 30 is drained through a drain passage 33. When the solenoid valve 14 is in an on (energized) state, the actuating pressure $P_S$ is increased, and the spool of the pressure control valve 13 is moved leftwardly. Therefore, the line pressure $P_L$ is supplied into the control pressure passage 31, so that the control pressure $P_C$ becomes equal to the line pressure $P_L$. There are further provided orifices 34, 35 and 36 in the fluid passages as shown in FIG. 2.

The solenoid valve 14 is controlled by a control signal (C) sent from the control unit 15. When the control signal is in an on state, the solenoid valve 14 is energized and the orifice 34 is closed. When the control signal is in an off state, the solenoid valve 14 is deenergized and the orifice 34 is opened.

The control unit 15 of this embodiment takes the form of a microcomputer mounted on the vehicle. The control unit 15 has an analog-to-digital converter circuit 151, a random access memory (RAM) 152, a read-only memory (ROM) 153, a central processing unit (CPU) 154, a clock circuit 155, and a control signal generating circuit 156.

The sensor group 16 of this embodiment comprises a transmission shift switch 161, a fully-closed throttle switch (idle switch) 162, a throttle opening sensor 163, a transmission output speed sensor 164, an engine speed sensor 165, and a turbine speed sensor 166. The A/D converter circuit 151 converts each of output signals (sl), (no), (ne) and (nt) of the sensors 163, 164, 165 and 166 from an analog from into a digital form.

The shift switch 161 senses a shift position of the automatic transmission, and produces an output signal which is in an on state when the automatic transmission is in a drive range.

The fully-closed throttle switch 162 produces an output signal which is in an on state when a throttle of the engine is in the fully closed state (idle state), and in an off state when the throttle is not closed.

The throttle opening sensor 163 senses the opening degree of the throttle, and produces the throttle opening signal (sl).

The transmission output speed sensor 164 senses a rotating speed No of the transmission output shaft 23, and produces the signal (no) representing the speed No. This signal (no) is used as a signal representing the vehicle speed.

The engine speed sensor 165 senses a rotating speed Ne of the torque converter input shaft 17, and produces the signal (ne) representing the speed Ne.

The turbine speed sensor 166 senses a rotating speed Nt of the torque converter output shaft 22, and produces the output signal (nt) representing the speed Nt.

The engine speed sensor 165 and the turbine speed sensor 166 are used for the creep control for preventing a creep of the vehicle, as mentioned later.

The control system of the first embodiment performs the creep control to prevent creep of the vehicle, and the start control to ensure smooth start of the vehicle, as shown in the flowchart of FIG. 3.

(I) Creep Control

The creep control is performed by executing steps of the flowchart of FIG. 3 in a sequence, 100, 101, 102, 103, 104, 105, 106.

At the step 102, the CPU 154 of the control unit 15 sets a FLAG 1 (condition code) of the RAM 152 to one when the throttle is in the fully-closed (idle) state. The FLAG 1 is used to indicate the condition in which the throttle is in the fully-closed state. At the step 105, the CPU 154 sets a FLAG 2 of the RAM 152 to one when the creep control is in operation. The FLAG 2 is used to indicate the condition in which the creep control is active.

The creep control of the step 104 is performed if and only if all answers of the three decision steps 100, 101 and 103 are affirmative. That is, the CPU 154 performs the creep control when the automatic transmission is in the drive range (step 100), the throttle is fully closed (step 101), and simultaneously the vehicle speed equals zero (step 103).

The creep control of the step 104 is performed in a chopped mode. Initially, a duty factor (or duty cycle) D of the control signal (c) is equal to 100% because the transmission is in the drive range. At the step 104, the CPU 154 decreases the duty factor of the control signal (c) from 100% to a low value $D_0$. Therefore, the engagement pressure of the start clutch 12 is decreased, and accordingly, a torque transmitted through the start clutch 12 to the transmission output shaft 23 is reduced. The control system prevents creep of the vehicle in this way. In this embodiment, the start clutch 12 is not fully disengaged during the creep control. The low duty factor $D_0$ for the creep control is so determined as to attain a predetermined slip rate (lowest value required to prevent creep), in accordance with a difference between the engine speed Ne sensed by the engine speed sensor 165 and the turbine speed Nt sensed by the turbine speed sensor 166. At the step 106, the control unit 15 outputs the control signal (c) whose duty factor D is set equal to the low value $D_0$.

(II) The creep control is not performed in the following cases.

(i) When the automatic transmission is not in the drive range, but in a neutral range or a parking range: In this case, the flow of the program follows a sequence of steps 100, 107, 106. Therefore, the control unit 15 outputs the control signal whose duty factor D is equal to 0%.

(ii) When the automatic transmission is in the drive range, but the throttle is not fully closed (normal driving state): In this case, the control unit 15 outputs the control signal of 100% duty factor by following the sequence of steps 100, 101, 108, 109, 110, 106.

(iii) When the transmission is in the drive range and the throttle is fully closed, but the vehicle speed is not equal to zero (coasting state on a downhill, for example): In this case, the sequence of steps is 100, 101, 102, 103, 111, 106. At the step 111, the CPU 154 resets FLAG 2 to zero if FLAG 2 is one, and sets the duty factor D equal to 100%.

(III) Start Control

The creep control is removed, and simultaneously the start control is initiated when the fully-closed throttle switch 162 is brought to the off state, that is, when the accelerator pedal is depressed, and the vehicle assumes a position ready to start moving.

The start control is divided into the following three stages.

(i) From start of the start control to end of a predetermined time interval $K_1$: The sequence of steps is 100, 101, 108, 112, 109, 113, 114, 106. Since FLAG 1 has been set to one at the step 102 to indicate the idle state, the CPU 154 proceeds from the step 108 to the step 112, at which the CPU 154 resets FLAG 1 to zero, and resets a TIMER to zero. At the step 109, the CPU 154 checks whether the creep control has been in operation by checking whether FLAG 2 is equal to one. At the step 113, the CPU 154 determines whether TIMER is equal to or greater than the predetermined time interval $K_1$, and then proceeds to the step 114. At the step 114, the CPU 154 resets a duty factor difference $\Delta D$ to zero, increments TIMER, and sets the duty factor D equal to 100%. Therefore, the control unit 15 outputs the control signal of 100% duty factor from the beginning of the start control to the end of the predetermined time interval $K_1$. When this routine is performed every 1 msec, for example, the predetermined time interval $K_1$ is equal to about 40 msec. In this way, the pressure of a high magnitude is supplied to the start clutch 12 from the instant at which the accelerator pedal is depressed, and the throttle is moved out of the fully closed state, until the predetermined time interval $K_1$ expires.

(ii) From end of $K_1$ until 100% duty factor is reached: The sequence of steps is 100, 101, 108, 109, 113, 115, 116, 117, 106. Since TIMER is equal to or greater than $K_1$, the CPU 154 proceeds from the step 113 to the step 115. At the step 115, the CPU 154 sets the duty factor D equal to $D_0 + \Delta D$. Then, at the step 117, the duty factor difference $\Delta D$ is increased gradually until the duty factor D reaches 100%. Therefore, the pressure supplied to the start clutch 12 is increased gradually.

(iii) Duty factor is equal to or greater than 100%: When the duty factor D reaches 100%, the flow of the program after the step 116 is changed to the route of steps 118, 110, 106. Thereafter, the CPU 154 follows the sequence of steps 100, 101, 108, 109, 110, 106 for the normal driving. The CPU 154 resets FLAG 2 to zero at the step 118, sets the duty factor D to 100% at the step 110, and outputs the control signal of 100% duty factor at the step 106. Thereafter, the duty factor of the control signal is maintained equal to 100%. That is, the start clutch 12 remains engaged by receiving the line pressure $P_L$.

Figure 4:
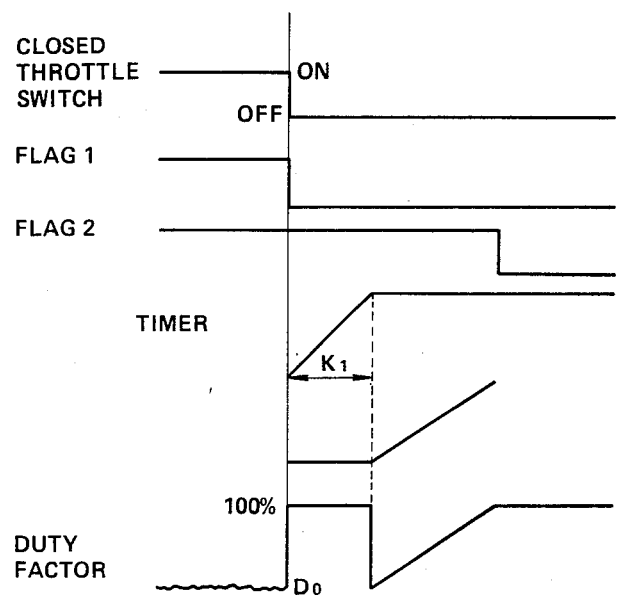
FIG. 4 is a timing chart for showing operations of the first embodiment.

The operations of the start control is shown in a timing chart of FIG. 4.

During the creep control, the fully-closed throttle switch 162 is in the on state, FLAG 1 is equal to one, FLAG 2 is equal to one, and the duty factor D is at a low disengage value equal to $D_0$.

When the fully-closed throttle switch 162 is changed from ON to OFF, the creep control is ceased and instead the start control is initiated. At this instant, FLAG 1 falls to zero, a first timer starts to increment, and the duty factor D increases from $D_0$ to a transient high value of 100%.

When the predetermined time interval $K_1$ expires, a second timer starts to increment, and the duty factor D falls from 100% to a transient low value equal to $D_0$ suddenly. Then the duty factor D increases gradually from the transient low value to a high engage value equal to 100%. When the duty factor D reaches 100%, FLAG 2 falls to zero. After that, the duty factor D remains equal to 100%.

Figure 5:
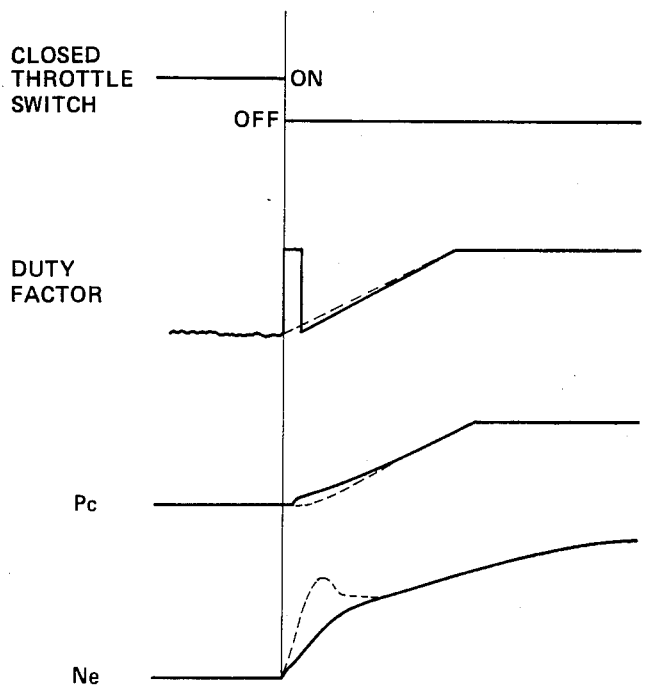
FIG. 5 is a timing chart for showing effects of the first embodiment.

Changes in the control pressure $P_c$ and the engine speed Ne during the start control are shown by solid lines in the timing chart of FIG. 5. Broken lines show characteristics obtained when a temporal increase in duty factor to 100% indicated by a rectangular pulse is eliminated. According to the prevent invention, as shown by the solid lines, the control pressure $P_c$ supplied to the start clutch 12 increases earlier near the beginning of the start control, and the engine speed Ne rises gradually in contrast to a steep rise in Ne shown by the broken line. In the case of the broken lines, the engine races, and the engine speed Ne rises rapidly at the early stage of the start control because the engagement of the start clutch 12 is delayed by reason of delay of the rise of the control fluid pressure $P_c$, and the inertial mass of the clutch plates 25. As shown by the solid line characteristic of Ne, the control system of the present invention can prevent the engine from racing by increasing the duty factor of the control signal to 100% temporarily at the beginning of the start control.

Figure 6:
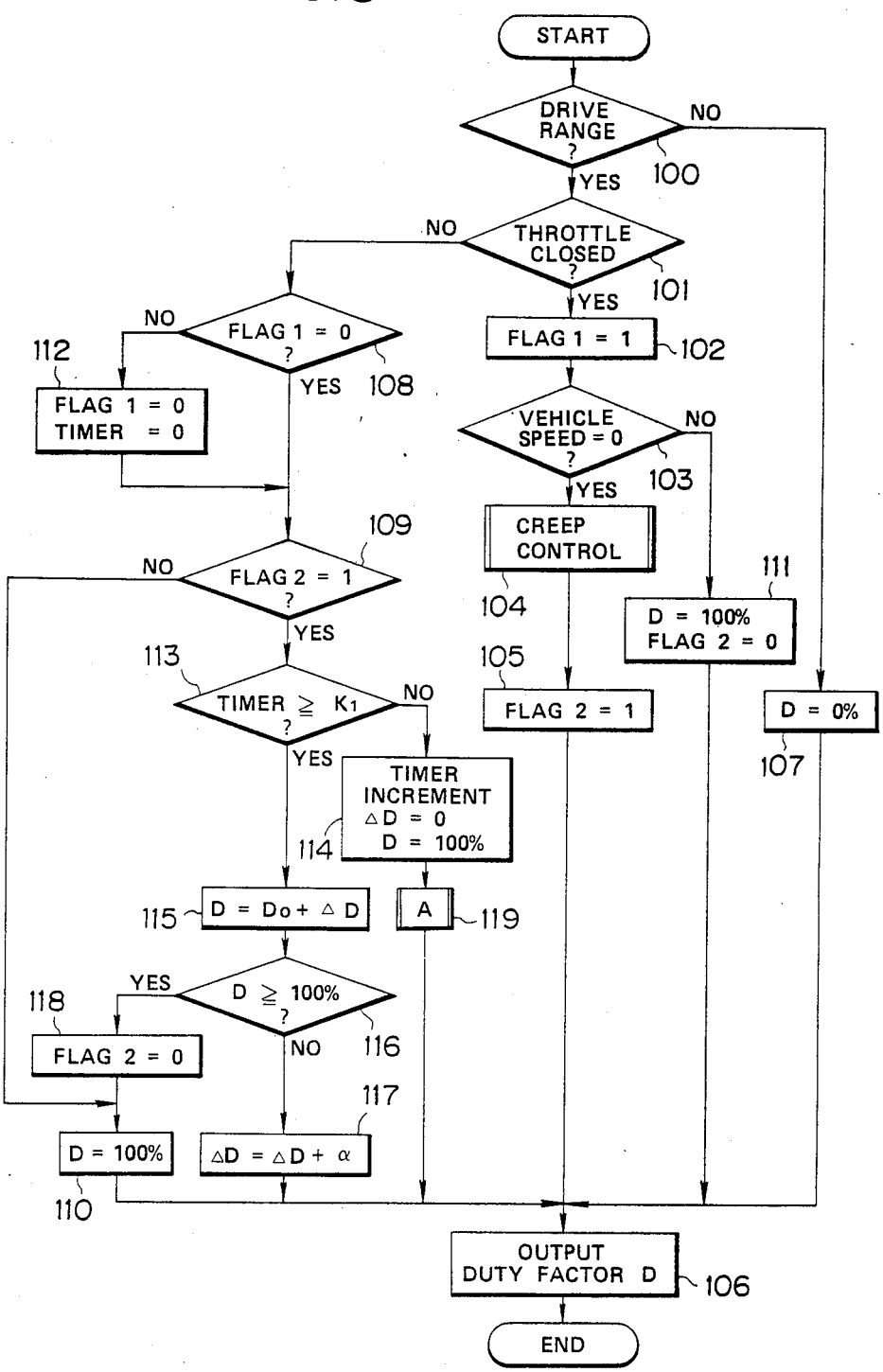
FIG. 6 is a flowchart of a program performed by a control unit of the second embodiment.

A second embodiment of the present invention is shown in FIG. 6. A control system of the second embodiment has the same construction as the control system of the first embodiment shown in FIG. 2. However, the control unit 15 of the second embodiment is programmed as shown in FIG. 6 instead of FIG. 3. The program of the second embodiment shown in FIG. 6 is different from the program of the first embodiment shown in FIG. 3 only in addition of a step 119.

Figure 7:
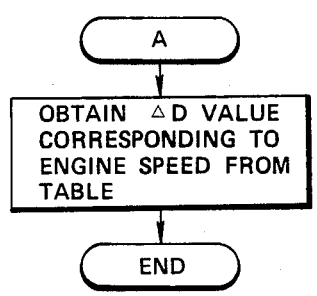
FIG. 7 is a flowchart showing a routine performed by the control unit of the second embodiment when a measurand is an engine speed.
Figure 8:
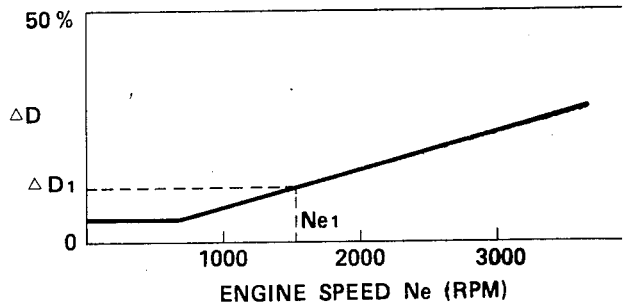
FIG. 8 is a graph of a relationship between the engine speed and a duty factor difference which is stored in the control unit.
Figure 9:
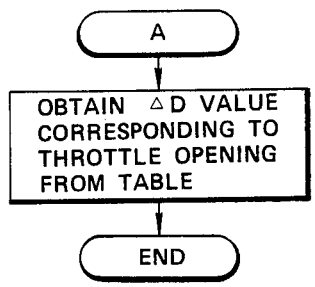
FIG. 9 is a flowchart showing a routine performed by the control unit when a measurand is a throttle opening degree.
Figure 10:
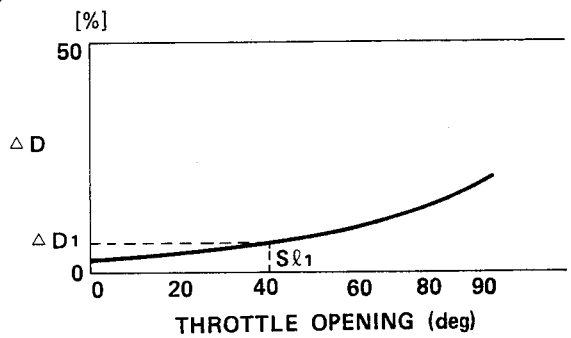
FIG. 10 is a graph of a relationship between the throttle opening degree and the duty factor difference which is stored in the control unit for use in the routine of FIG. 9.

When TIMER becomes equal to the predetermined value $K_1$, the CPU 154 of the second embodiment proceeds from the step 113 to the step 115. At the step 115, the CPU 154 sets the duty factor D equal to the sum of the low duty factor value $D_0$ and the duty factor difference $\Delta D$ which is set equal to an initial duty factor difference $\Delta D_1$ at the step 119. The initial duty factor difference $\Delta D_1$ is determined in accordance with the engine speed Ne as shown in FIGS. 7 and 8, or in accordance with the throttle opening degree (sl) as shown in FIGS. 9 and 10. In either case, the CPU 154 performs a table lookup to determine the value of the duty factor difference ΔD corresponding to the current value of the engine Ne or the throttle opening degree (sl) each time the routine is entered. The initial duty factor difference ΔD$_1$ is the value of the duty factor difference ΔD corresponding to the engine Ne$_1$ or the throttle opening degree sl$_1$ at the end of the predetermined time interval K$_1$.

Figure 11:
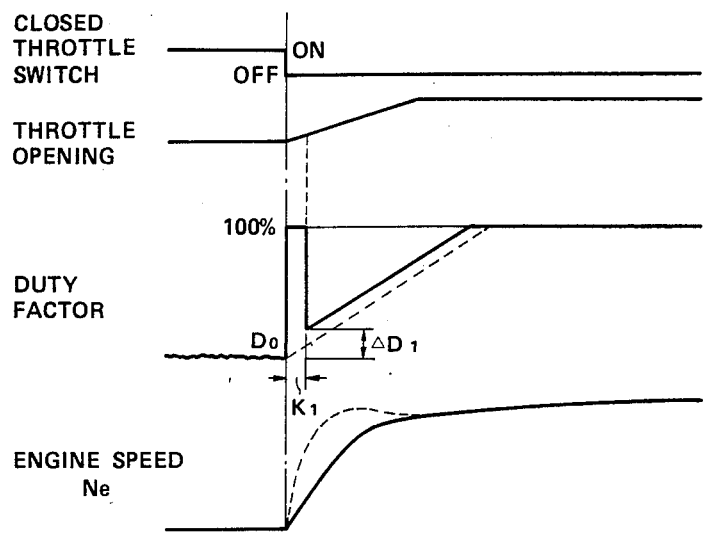
FIG. 11 is a timing chart showing operations of the second embodiment.

The operations of the control system of the second embodiment are shown in the timing chart of FIG. 11. During the creep control, the closed throttle switch 162 is in the on state, the duty factor D of the control signal is equal to the low value D$_0$. When the accelerator pedal is depressed, and the closed throttle switch 162 is turned to the off state, the creep control is cancelled, and the start control is started. From the beginning of the start control to the end of the predetermined time interval K$_1$, the duty factor D is maintained equal to 100%. At the end of the time interval K$_1$ starting from the beginning of the start control, the duty factor D falls rapidly from 100% to the sum of the low duty factor D$_0$ for the creep control and the initial duty factor difference ΔD$_1$. Then the duty factor D increases gradually. In this way, the control system of the second embodiment can prevent a rapid rise of the engine speed Ne shown by a broken line in FIG. 11. The control system of the second embodiment can prevent the engine from racing efficiently by using the initial duty factor difference ΔD$_1$ corresponding to the engine output even if the accelerator pedal is depressed strongly in starting the vehicle. In the second embodiment, the duty factor is maintained equal to 100% from the beginning of the start control to the end of the time intervals K$_1$. However, it is optional to eliminate the first stage of the start control in which the duty factor remains equal to 100% if the lag of the hydraulic system is sufficiently small.

Figure 12:
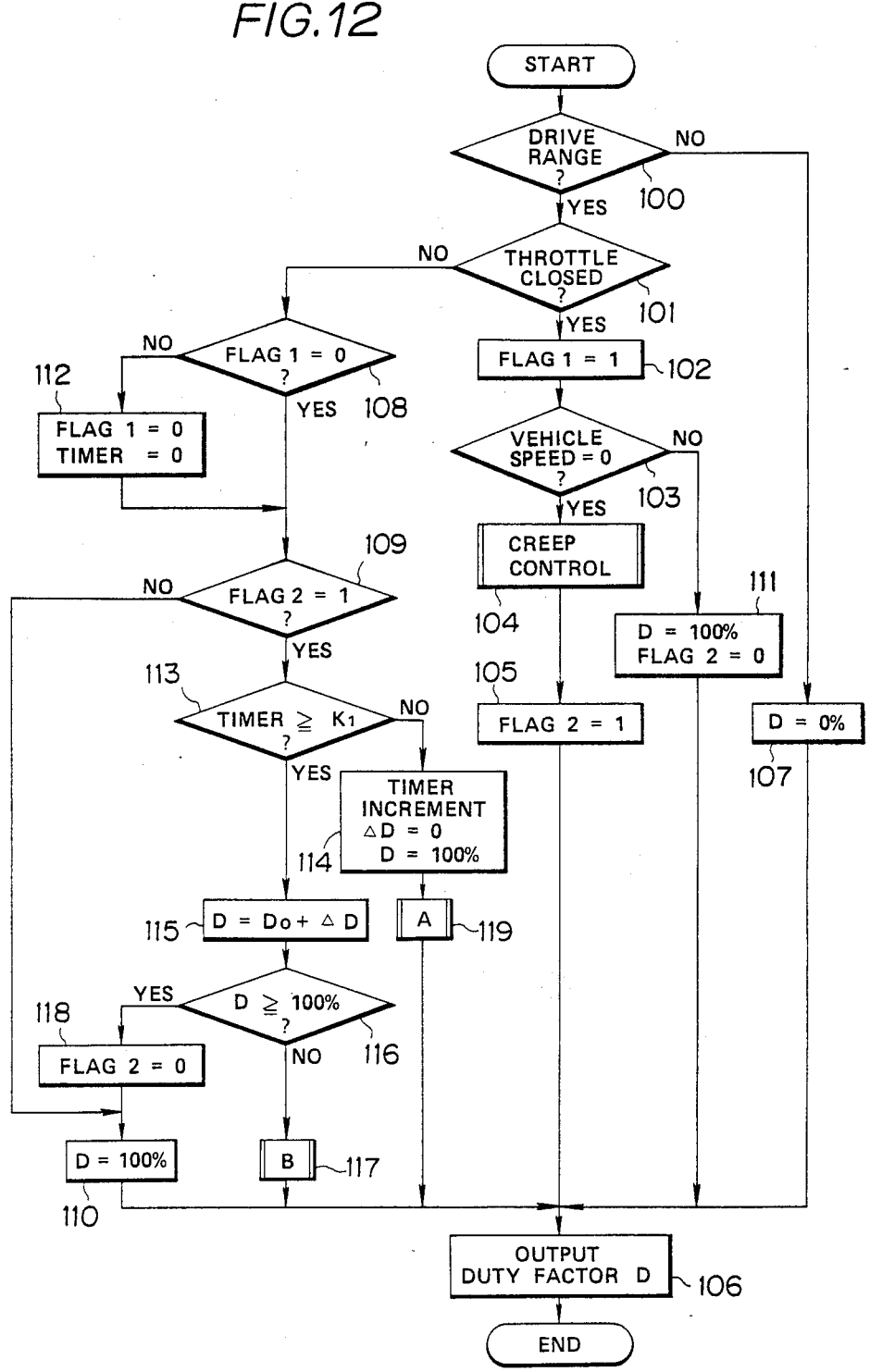
FIG. 12 is a flowchart of a program performed by a control unit of the third embodiment.

A third embodiment of the present invention is shown in FIG. 12. A control system of the third embodiment has the same construction as the control system of the first embodiment shown in FIG. 2. However, the control unit 15 of the third embodiment is programmed as shown in FIG. 12. The program of the third embodiment is different from the program of the second embodiment shown in FIGS. 6, 7 and 9 only in the step 117.

Figure 13:
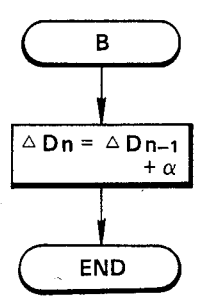
FIG. 13 is a flowchart of a routine performed by the control unit of the third embodiment.
Figure 14:
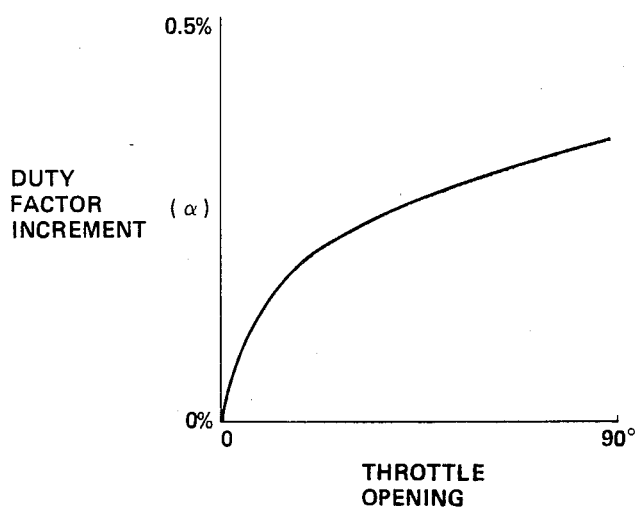
FIG. 14 is a graph of a relationship between the throttle opening degree and a duty factor increment which is stored in the control unit for use in the routine of FIG. 13.

When TIMER becomes equal to the predetermined value K$_1$, the CPU 154 of the third embodiment proceeds from the step 113 to the step 115. At the step 115, the CPU 154 sets the duty factor D equal to the sum of the low duty factor value D$_0$ and the duty factor difference ΔD which has been set equal to the initial duty factor difference ΔD$_1$ corresponding to the engine speed Ne or the throttle opening degree at the step 119. At the step 117, the CPU 154 determines a new duty factor difference ΔD$_n$ (n=1, 2, 3, . . . ) by adding a duty factor increment α to a previous duty factor difference ΔD$_{n-1}$ each time the routine is performed, as shown in FIG. 13. The duty factor increment α is determined in accordance with the engine output. In the third embodiment, the duty factor increment α is determined in accordance with the throttle opening degree (sl), as shown in FIG. 14. In order to convert the throttle opening degree to the engine output, the rate of increase of the duty factor increment α is made high in a small throttle opening range, and made low in a large throttle opening range, as shown in FIG. 14. In this way, the engine power output is estimated from the throttle opening degree, and related to α. The duty factor increment α may be determined by a table lookup, or may be determined by multiplying a signal value TVO corresponding to the throttle opening degree by a coefficient β.

Figure 15:
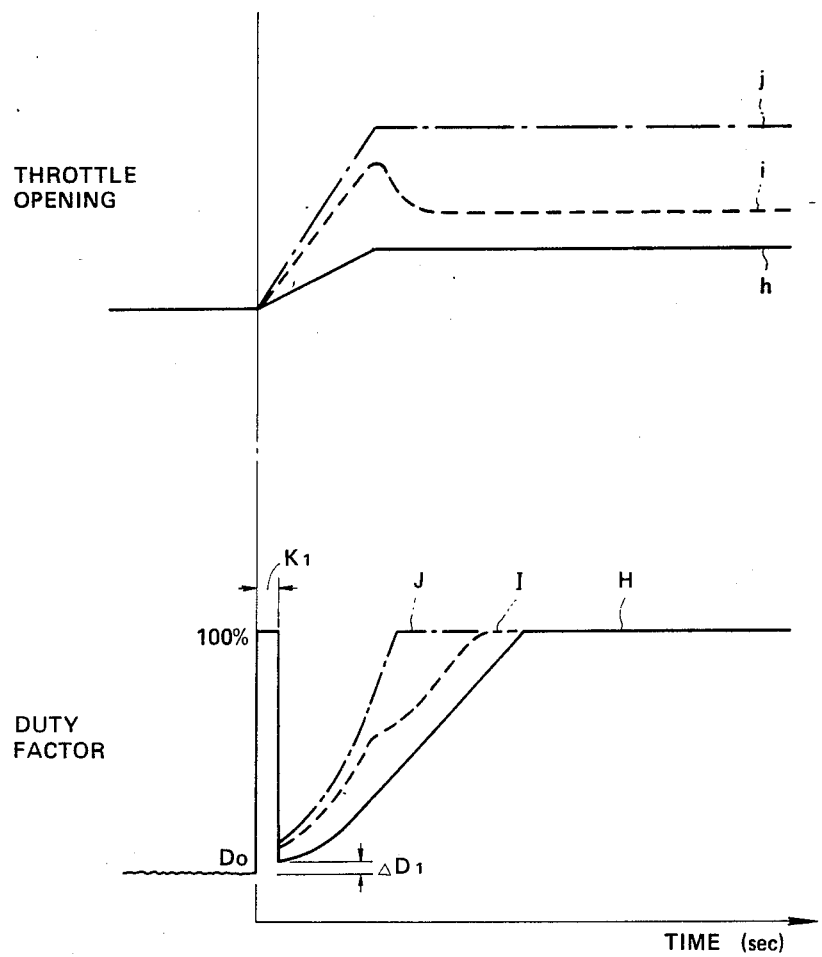
FIG. 15 is a timing chart showing operations of the third embodiment.

The operations of the third embodiment is shown in FIG. 15. When the vehicle is started by depressing the accelerator pedal slightly, the throttle opening degree rises gradually and then remains constant as shown by a solid line h in FIG. 15. In this case, the duty factor D of the control signal changes as shown by a solid line H in FIG. 15. The duty factor D equals the low value D$_0$ during the creep control. From the end of the creep control or the beginning of the start control to the end of the predetermined time interval K$_1$, the duty factor D is held equal to 100%. At the end of the interval K$_1$, the duty factor D falls from 100% to the sum of the low value D$_0$ and the initial duty factor difference ΔD$_1$ corresponding to the throttle opening degree (or the engine speed) at that instant. Thereafter, the duty factor is increased gradually by increasing the duty factor difference ΔD$_n$ by the increment α corresponding to the throttle opening degree in each cycle until 100% is reached.

When the vehicle is started by depressing the accelerator pedal deeply and then returning the pedal slightly, the throttle opening degree varies as shown by a broken line i in FIG. 15, and the duty factor varies as shown by a broken line I. The rate of increase of the duty factor is varied in accordance with change in the throttle opening degree. The duty factor reaches 100% earlier than the characteristic line H because a horizontal portion of the characteristic line i in which the throttle opening degree is held constant is higher than the horizontal portion of the line h.

When the vehicle is started by depressing the accelerator pedal strongly, the throttle opening degree varies as shown by a one-dot chain line j, and the duty factor varies as shown by a one-dot chain line J in FIG. 15. As shown by the line J, the duty factor rises steeply in accordance with the rate of increase of the throttle opening degree, and reaches 100% earliest because the horizontal portion of the line j is highest.

Thus, the control system of the third embodiment engages the start clutch rapidly when the accelerator pedal is depressed greatly in starting the vehicle, so that racing of the engine and burning of the clutch plates are prevented. When the depression degree of the accelerator pedal in starting the vehicle is small, the control system of the third embodiment retards the engagement of the start clutch 12 so that shock due to engagement of the start clutch is prevented. Furthermore, the control system of the third embodiment can ensure smooth engagement of the start clutch 12 by using the duty factor increment α which is variable in accordance with the throttle opening degree.

Figure 16:
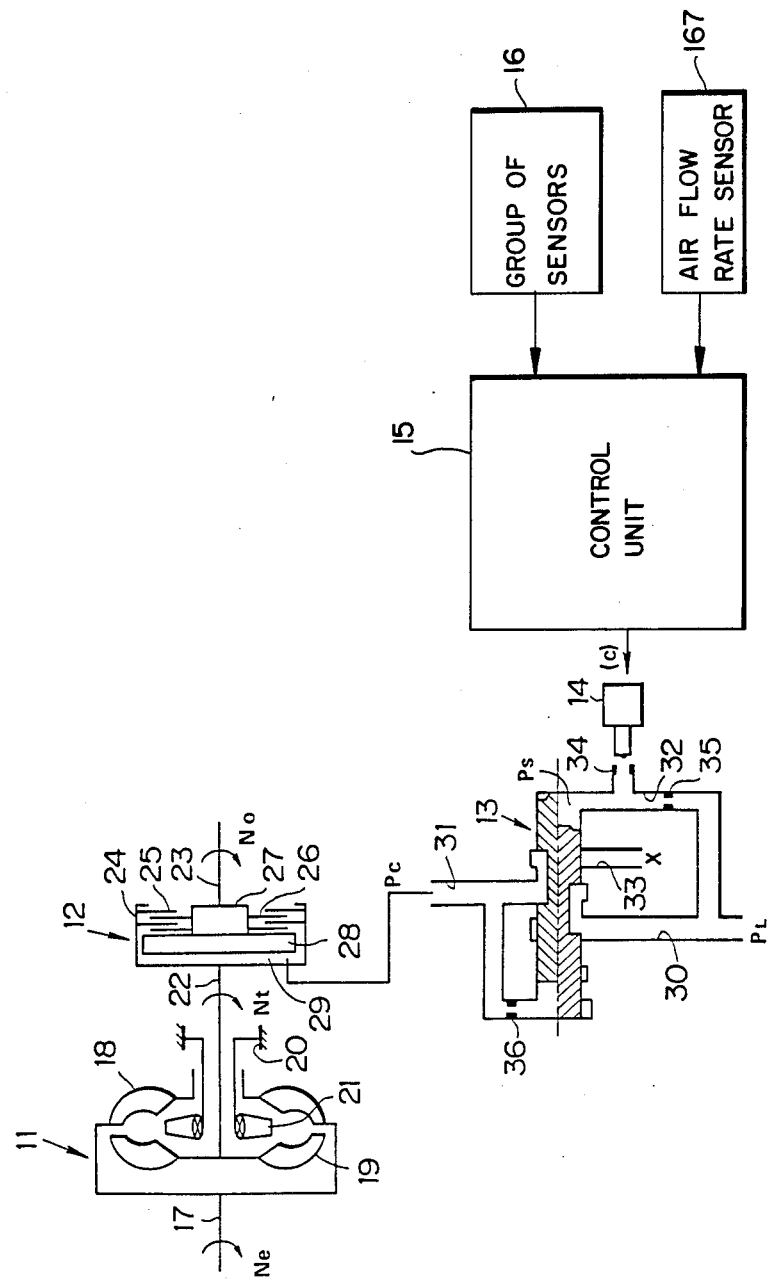
FIG. 16 is a schematic view similar to FIG. 2, but showing a modification of the third embodiment.

If the lag of the hydraulic system is small, it is not necessary to insert the first period of the start control in which the duty factor is held equal to 100% during the time interval K$_1$. In the third embodiment, the duty factor increment α is determined in accordance with the throttle opening degree. However, it is optional to determine the duty factor increment by estimating the engine output from the engine speed Ne or the flow rate of the intake air of the engine. In the latter case, a flow rate sensor is further provided as shown in FIG. 16.

In the first, second and third embodiments, the start control of the present invention is initiated when the vehicle is started from the standing position in which the creep control is in operation. However, the present invention is also applicable to the case in which the vehicle is started by shifting the transmission from the neutral state to the drive state. In the first, second and third embodiments, the duty factor $D_0$ used during the creep control is not equal to zero. However, it is optional to employ such a creep control that the start clutch is fully disengaged. The control system of the present invention may be arranged to control the fluid pressure supplied to the start clutch directly without employing the duty factor control.

What is claimed is:

1. A control system, comprising:
    a vehicular automatic transmission for transmitting power from an engine to wheels of a vehicle, said transmission having at least a start clutch which is engaged by fluid pressure,
    actuator means for varying an engagement force of the start clutch by varying the fluid pressure, said actuator means having a first position for increasing the fluid pressure to engage the start clutch and a second position for decreasing the fluid pressure to disengage the start clutch, said actuator being moved between said first and second positions in response to a control signal having a variable duty factor such that, as the duty factor increases, the actuator remains longer in the first position,
    sensor means responsive to a position of an accelerator member of said engine for producing a start signal representing a start of the vehicle when said accelerator member moves away from an idle position, and
    controller means connected with said sensor means for controlling the fluid pressure supplied to the start clutch by varying said duty factor of said control signal upon receipt of said start signal so that said duty factor of said control signal increases immediately from a low disengage value to a transient high value to increase said fluid pressure, then falls from said transient high value to a transient low value to decrease said fluid pressure, and finally increases gradually and continuously from said transient low value to a high engage value to gradually increase said fluid pressure.

2. A control system according to claim 1 wherein said sensor means senses a plurality of operating conditions of the vehicle which are required to identify a predetermined standing state of the vehicle, and a start of movement of the vehicle from said standing state, and wherein said controller means varies said duty factor of said control signal so that said duty factor equals said low disengage value when the vehicle is in said standing state.

3. A control system according to claim 2 wherein said sensor means comprises an idle sensor for sensing the idle position of the accelerator member, a transmission shift sensor for sensing whether the automatic transmission is in a predetermined range, and a vehicle speed sensor for sensing whether the speed of the vehicle is equal to zero, and wherein said controller means maintains said duty factor equal to said low disengage value when the automatic transmission is in said predetermined range, the accelerator is in said idle position, and simultaneously the vehicle speed is equal to zero.

4. A control system according to claim 3 wherein said transient high value of said duty factor and said high engage value of said duty factor are equal to a 100% duty factor.

5. A control system according to claim 1 wherein said transient low value is equal to a sum of said low disengage value and an initial duty factor increment which is equal to or greater than zero, and a second increment is added to said duty factor each time a predetermined time period has elapsed such that said duty factor increases gradually from said transient low value to said high engage value.

6. A control system according to claim 5 wherein said initial difference is equal to zero, and said increment is constant.

7. A control system according to claim 5 wherein said sensor means senses an engine output condition indicative of power output of the engine, and said initial duty factor increment is determined in accordance with the value of said engine output condition at the end of said predetermined duration.

8. A control system according to claim 7 wherein said engine output condition is a rotating speed of the engine, and said initial duty factor increment is increased as the value of said engine output condition at the end of said duration is increased.

9. A control system according to claim 7 wherein said engine output condition is a throttle opening degree of the engine, and said initial duty factor increment is increased as the value of said engine output condition at the end of said duration is increased.

10. A control system according to claim 7 wherein said second increment is determined in accordance with said engine output condition in such a manner that said second increment is increased as said engine output condition increases.

11. A control system according to claim 5 wherein said sensor means senses an engine output condition indicative of power output of the engine, and said second increment is determined in accordance with the value of said engine output condition in such a manner that said second increment is increased as said engine output condition increases.

12. A control system according to claim 11 wherein said engine output condition is a throttle opening degree of the engine.

13. A control system according to claim 11 wherein said engine output condition is rotating speed of the engine.

14. A control system according to claim 11 wherein said engine output condition is flow rate of intake air of the engine.

15. A control system for a vehicular automatic transmission having at least a start clutch which is engaged by fluid pressure, comprising:
    actuator means for varying an engagement force of the start clutch by varying the fluid pressure, said actuator means having a first position for increasing the fluid pressure to engage the start clutch and a second position for decreasing the fluid pressure to disengage the start clutch, said actuator means being moved between said first and second positions in response to a control signal having a variable duty factor such that, as said duty factor increases, said actuator remains longer in said first position,
    sensor means responsive to a position of an accelerator member of said engine for producing a start signal representing a start of the vehicle when the accelerator member is moved away from an idle position, and for sensing an engine output condition indicative of a power output of the engine of the vehicle, and controller means connected with said sensor means for controlling the fluid pressure supplied to the start clutch by varying the duty factor of said control signal, said controller means increasing the duty factor of said control signal gradually upon receipt of said start signal from a transient low value which is determined in accordance with the value of said engine output condition immediately after receipt of said start signal.

16. A control system for a vehicular automatic transmission having at least a start clutch which is engaged by supplying a fluid pressure, comprising:

actuator means for varying an engagement force of the start clutch by varying the fluid pressure, said actuator means having a first position for increasing the fluid pressure to engage the start clutch and a second position for decreasing the fluid pressure to disengage the start clutch, said actuator means being moved between said first and second positions in response to a control signal having a variable duty factor such that, as said duty factor increases, said actuator remains longer in said first position, sensor means responsive to a position of an accelerator of said engine for producing a start signal representing a start of the vehicle by sensing when the accelerator member is moved away from an idle position, and for sensing an engine output condition indicative of power output of the engine of the vehicle, and controller means connected with said sensor means for controlling the fluid pressure supplied to the start clutch by varying the duty factor of the control signal, said controller means increasing the duty factor of said control signal in accordance with an integral of said engine output condition upon receipt of said start signal.

* * * * *